Aug. 17, 1948. M. GRAVINA ET AL 2,447,007
CLUTCH DEVICE
Filed Aug. 20, 1941 5 Sheets-Sheet 2

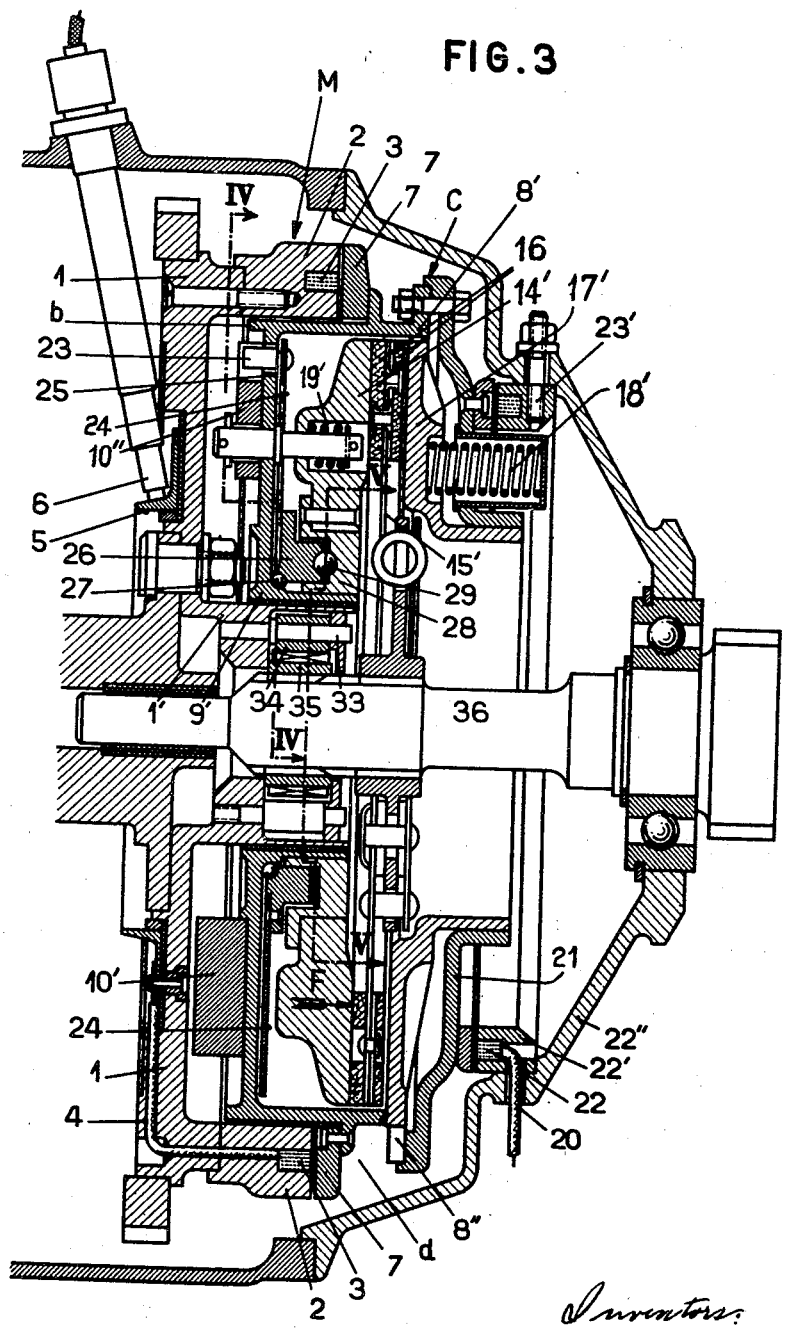

Aug. 17, 1948.  M. GRAVINA ET AL  2,447,007
CLUTCH DEVICE
Filed Aug. 20, 1941  5 Sheets-Sheet 4

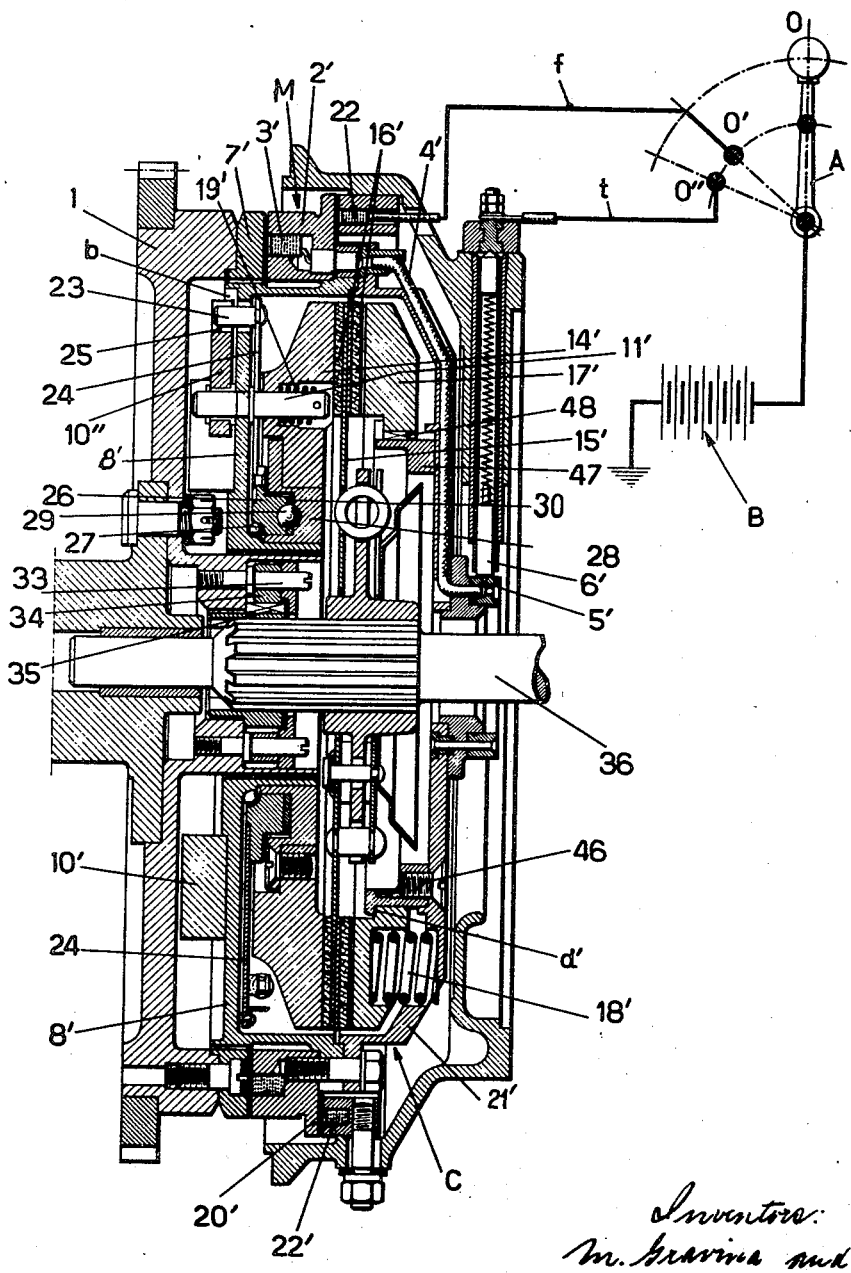

Patented Aug. 17, 1948

2,447,007

UNITED STATES PATENT OFFICE 2,447,007

CLUTCH DEVICE

Michel Gravina and Marcel Hawadier, Paris, France; vested in the Attorney General of the United States Application August 20, 1941, Serial No. 407,662
In France April 26, 1940

Section 1, Public Law 690, August 8, 1946
Patent expires April 26, 1960

14 Claims. (Cl. 192—105)

This invention relates to disconnectable couplings or clutch devices.

Electromagnetic clutch devices of the different known types all involve the drawback of a brutal operation, there being no slip whilst letting in the clutch. However, this type of clutch is a very efficient one by reason of said absence of any slip.

On the other hand, operation of centrifugal clutches is smooth by construction, but if the driven shaft is not interrupted anywhere (as for instance by means of a speed change gear comprising an idler gear), the engine may not be raced; in other words, it is impossible to accelerate the driving shaft above the particular speed which has been chosen for engagement of the clutch; furthermore, if there is no trigger release for the system of centrifugal weights at the desired speed, there will be a greater wear of the clutch linings, which wear is produced by the slight slip with the engine throttled down.

Each type of clutch has therefore its advantages and drawbacks, the latter being great enough not to permit satisfactory results from previous attempts to employ, chiefly on motorcars, either electromagnetic or mechanical centrifugal clutches.

The chief object of this invention is to provide an improved coupling or clutch device which comprises, in combination, an electromagnetic clutch (which by its nature is not progressive) and a progressive mechanical centrifugal clutch. This combination provides a new device having the advantages of both systems without having their drawbacks.

Other and more detailed objects of the invention and the manner in which these several objects are attained will best be understood from a consideration of the ensuing portion of this specification, taken in conjunction with the accompanying drawings illustrating, in a more or less diagrammatic manner, several forms of the coupling device for carrying the invention into effect. Said device is shown as applied to the clutch of a motor car, but it is intended that there may be other applications thereof and that all matter contained in the following description or shown in the accompanying drawings shall be interpreted as illustrative and not in a limiting sense.

Fig. 3 is an axial sectional view similar to Fig. 1, showing a modified form of the system of centrifugal weights;

Fig. 8 is an axial sectional view of a modified form of embodiment which form is derived from the embodiment of Fig. 3;

In the different embodiments the coupling device of the invention comprises, in a general manner, an electromagnetic clutch and a mechanical centrifugal clutch arranged in said electromagnetic clutch, both devices being bodily designated by M and C respectively in Figs. 1, 3, 7 and 8.

Figure 1:
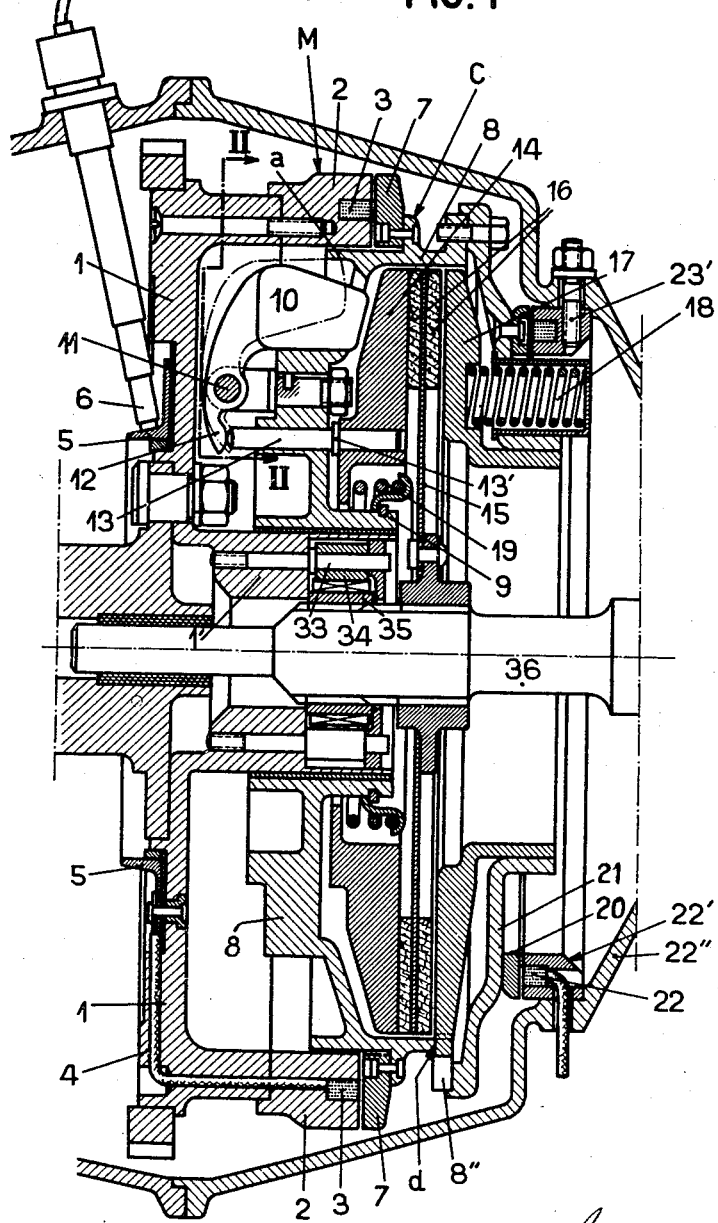
Fig. 1 is an axial sectional view of a first embodiment of the invention.

The arrangement of the electromagnetic clutch is the same in Fig. 1 and in Fig. 3; therefore it will be described in a detailed manner only with reference to Fig. 1, similar numerals being employed to designate similar parts throughout the several views. Referring first to Fig. 1, the primary member or fly-wheel 1 of the engine has fixedly secured thereto by any convenient means the electromagnet 2 of the electromagnetic clutch device. The windings 3 of said electromagnet are energized through an insulated wire 4 connected to a slip ring 5 which is fixedly secured to said fly-wheel 1 and receives current from a brush 6, the return circuit being formed by the metallic mass of the device.

The armature 7 of said electromagnet 2 which registers therewith and is arranged at a small distance therefrom is rigidly connected by any convenient means with a cup-shaped disc or secondary member 8 which carries the centrifugal clutch device that will be described hereafter.

The assembly described forms the electromagnetic clutch device which is identical with that of the modified form of Fig. 3. In this latter figure however the cup-shaped disc 8' which corresponds to the cup 8 of Fig. 1 is somewhat modified to a purpose which shall be indicated hereafter.

There will be now described the mechanical centrifugal clutch as incorporated by the embodiment of Fig. 1.

The cup 8 rigidly connected with the armature 7 is rotatably and slidably mounted, by means of its hub portion 9, on a sleeve fixedly secured to said fly-wheel 1. Said cup 8 has mounted thereon a plurality of pins 11 having pivotally connected thereto centrifugal weights 10. The special form of said centrifugal weights is clearly shown in Fig. 1, and it results from said figure that in this first embodiment of the invention the centrifugal weights move in planes passing through the axis of the device, the normal position of the centrifugal weight being indicated in full lines, and the operative position (corresponding to clutch let in) in dash-and-dot lines.

Each centrifugal weight 10 comprises an enlarged part outwardly extending from its associated pivot 11 and having its centre of gravity suitably arranged to provide a centrifugal force as great as possible, and a smaller part 12 inwardly projecting from said pivot 11 and forming an actuating finger.

The cup 8 has axially extending therein a plurality of bores registering with said actuating fingers 12 integral with each centrifugal weight, each bore having slidably engaged therein a rod 13 which comprises a shoulder 13' engaging the disc 14 of the clutch. The usual clutch-disc 15 supporting the clutch-linings 16 and rigidly connected with the driven shaft 36 is arranged in a known manner between said disc 14 and a second disc 17 angularly connected with said cup 8 through notches 8". Said disc 17 is urged towards the clutch-disc 15 by clutch-springs 18 and engages at $d$ an abutment to limit its axial displacement.

Said abutment limits also the clearance of the linings of the clutch-disc 15. On the other hand, the disc 14 is urged by a spring 19 which serves also to restore the initial position of the centrifugal weights.

As the centrifugal force causes the flying weights to move from the position indicated in full lines in Fig. 1 to the position indicated in dash-and-dot lines, said weights press, by fingers 12, said rods 13, causing them to push, by their shoulders 13', said disc 14 for engaging the clutch.

This embodiment of centrifugal coupling is completed by an electromagnetic brake device the purpose of which will be described in conjunction with the operation of the mechanism. Said brake comprises an armature 20 rigidly connected with the cup 8 through a disk 21 and an electromagnet 22, 22' axially adjustable and fixedly secured to the housing 22" by means of threaded bolts 23'.

Figure 2:
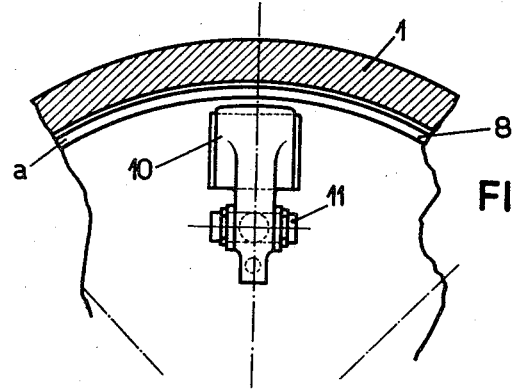
Fig. 2 is a partial transverse sectional view, taken on line II—II of Fig. 1, and showing details of arrangement of one centrifugal weight.

The modified form of embodiment shown in Figs. 3 to 6 inclusive differs from the form of Figs. 1 and 2 only by the arrangement of the flying weights and the manner in which they operate the disc of the mechanical clutch.

Figure 4:
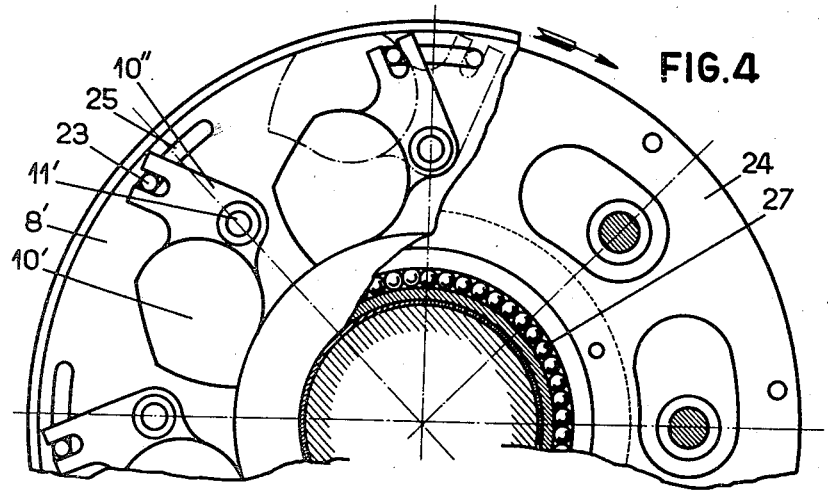
Fig. 4 is a partial transverse sectional view, taken on line IV—IV of Fig. 3, some parts being broken away.

Referring to Figs. 3 and 4, in this embodiment the flying weights 10' are adapted to pivot in a transverse plane relatively to the axis of the fly-wheel 1 as being journaled about pivot pins 11' mounted on the cup-shaped disc 8' the shape of which is suitably modified to this purpose, comparatively to the first embodiment described. Each centrifugal weight has integral therewith and outwardly projecting therefrom an arm 10" the forked end of which (Fig. 4) engages a pin 23 secured on a disc 24 and free to move in an arcuate slot 25 cut out from the cup 8'.

Figure 5:
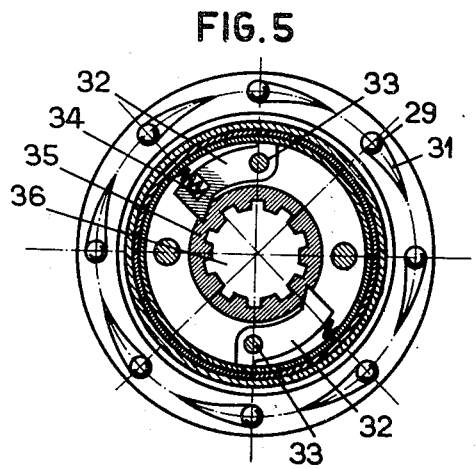
Fig. 5 is a partial transverse sectional view, taken on line V—V of Fig. 3.
Figure 6:
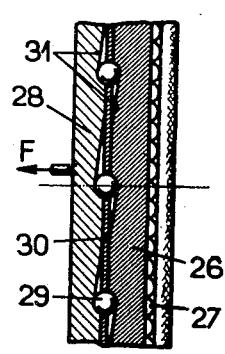
Fig. 6 shows a detail of the same form of clutch device.

The disc 24 is rigidly connected with a ring 26 journaled for rotation about the hub portion 9' of the cup 8' by means of a ball bearing 27 which forms an abutment to prevent sliding of said ring in the axial direction. Registering with said ring 26 is arranged a second ring 28 rigid with said first clutch disc 14'. A suitable number of balls 29 is interposed between the rings 26 and 28 which balls are preferably located by means of a cage 30 (Fig. 6). The registering surfaces of said rings 26 and 28 comprise, at the respective points of said balls 29, depressed cam surfaces 31 the depth of which decreases in opposite directions on said pair of rings (Figs. 5 and 6). By this arrangement, when the flying weights 10' move under the action of the centrifugal force from the position shown in full lines in Fig. 4 to the position in dash-and-dot lines, causing the disc 24 (and therefore also the ring 26) to turn to an angle defined by said slots 25 (Fig. 4), the balls 29 are caused to roll. The ring 26 being axially located by said ball bearing 27, and by reason of the shape of the recesses 31, ring 28 slides axially in the direction of the arrow F (Fig. 6). Said ring 28 being rigidly connected with the disc 14', the latter is urged in the direction of the arrow F (Fig. 3) to engage the clutch in the usual manner, the disc 15' supporting the clutch linings 16' being compressed between the discs 14' and 17'. The latter disc is operatively engaged by the clutch springs 18' and engages at $d$ an axial abutment. Springs 19' provide a restoring means for the disc 14' and the centrifugal weights.

In either of the embodiments described the reaction of the clutch is confined to the cup-shaped member 8, and therefore there is no axial push on the fly-wheel of the engine.

By reason of its particular arrangement the coupling which forms the object of this invention is necessarily disengaged when the engine is stopped. Thus it is not possible to turn the engine by pushing the car (with the gear engaged in one speed combination), as is done sometimes to start the engine in case of breakdown of the starter. In order to permit this operation, the clutch device comprises, according to a particular feature of our invention, a pawl-and-ratchet-wheel device or free wheel mechanism a form of which is shown as an example in Figs. 1, 3, and 5.

The sleeve 1' extending from the fly-wheel 1 has mounted thereon a pair of pawls 32 pivotally connected with pins 33 and operatively engaged by springs 34 which urge them into engagement with notches cut in a sleeve 35 splined to the shaft 36.

When the engine is stopped, the pawls are in the position shown in Fig. 5: thus the shaft 36 is operatively connected with the fly-wheel 1, and when the car is advanced by pushing, the engine is positively driven. However as soon as the engine is started, the centrifugal force causes the pawls 32 to move outwardly against the action of the springs 34, and the pawls are disengaged from the notches. Thus the connection of the shaft 36 with the fly-wheel 1 is interrupted and the system is disengaged. The pawls are in this latter position whilst driving.

The two first forms of our coupling device operate as follows (for the sake of simplicity, the clutch device is supposed to be mounted on a motor car, but it is to be understood that this example is to be interpreted as illustrative and not in a limiting sense):

When the engine has been started, it may be raced without causing the clutch to operate; as soon however as the car is desired to be started, the current is sent from the battery in the winding 3 of the electromagnet 2 which is thus energized and attracts immediately the armature 7; thus the parts 2 and 7 of the system are rigidly connected with each other, but the clutch is not yet let in. To operate engagement of the clutch, the speed of the engine must reach the speed, predetermined by construction, at which the flying weights are moving, under the action of the centrifugal force, to their outermost position (indicated in dash-and-dot lines in Fig. 1 for the first embodiment and in Fig. 4 for the modified form).

As it has been indicated hereinbefore, this movement of the flying weights causes the disc 14 (or 14'), either directly (as is the case of Figs. 1 and 2) or indirectly through balls 29 and cam recesses 31 (as is the case of Figs. 3 to 6 inclusive), to slide axially and thus to let in the clutch by compression of the linings 16 (or 16') between the discs 14 (or 14') and 17 (or 17').

When the centrifugal weights come to their outermost position in which the mechanical clutch device is engaged, it is important not to let them engage with the fly-wheel or a part rigid therewith, which engagement might produce a braking action impairing the operation of the mechanism. To avoid this drawback there has been provided a projection a (or b) integral with the cup member 8 (or 8') and adapted to be engaged by the flying weights in their outermost position.

The combined clutch which has now been described permits, when mounted on a motor car, suppression of the clutch pedal, in which case the car is operated as follows:

To start the car, the engine being running and the speed change lever being put on the desired gear, the contact of the energizing circuit of the electromagnet 2, 7 is closed, and then it is sufficient to race the engine: as soon as the engine reaches the speed on which the centrifugal clutch has been adjusted, the clutch is let in and the car starts in a perfectly smooth manner.

To pass to a higher speed, the angular speed of the flying weights must be reduced to disengage the centrifugal system. This is the object of the electromagnetic brake 20—22' which has been described hereinbefore. The operation is the following:

The energizing circuit of the clutch electromagnet 2—7 having been interrupted, the winding 22 of the electromagnetic brake 20—22' is energized for a very short time, which produces slowing down of the cup 8 (or 8'), causing the flying weights to return to their inoperative position in which the mechanical clutch is disengaged. Now the speed is changed, the electromagnet 2—7 is again energized and the engine is raced. The operations of opening and closing of the energizing circuits of the electromagnets 2—7 and 20—22' may be combined or carried out by means of a single control device suitably designed.

In the two embodiments hereinbefore described, the centrifugal weights are inoperative as long as no current energizes the electromagnet of the electromagnetic clutch, whatever may be the speed of the engine. Thus there is no wear of the clutch linings.

If the clutch device is mounted for instance on a motor car or on a machine with a gear-box comprising several speeds, it must be possible to avoid the slight friction of the clutch linings (and thus the wear thereof) and the risk of stopping the engine when it is throttled down, even if current passes through the winding of the electromagnet of the electromagnetic clutch. This will best be understood by supposing the clutch to be utilized on a motor car where the speed change lever is put on the first speed or on the reverse, current thus energizing the winding of the electromagnetic clutch, and the engine is throttled down. In this condition it is important to prevent the flying weights from operating. Therefore they must be locked, to be released only at a slightly lower speed than the speed chosen for engaging of the clutch device.

There will be described now modified forms wherein there is provided a locking device for the flying weights of the centrifugal mechanical clutch, which device retains said weights in inoperative position as long as the coupling rotates below a predetermined speed.

Figure 7:
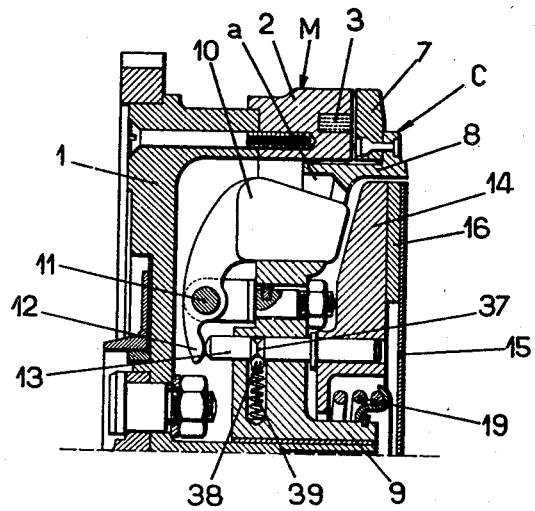
Fig. 7 is a partial longitudinal sectional view of a modified form of the embodiment of Fig. 1, showing diagrammatically a locking device for the centrifugal weights, the scope of which will be indicated hereafter.
Figure 10:
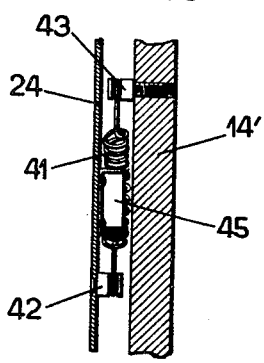
Fig. 10 shows a detail of the mechanism.
Figure 11:
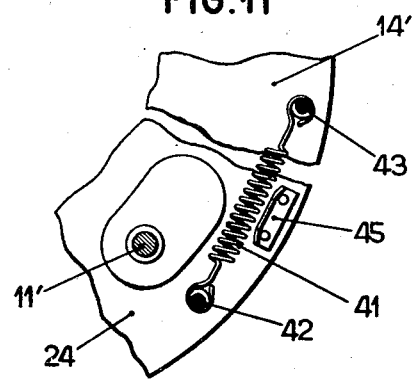
Fig. 11 is a partial view at 90 degrees relatively to Fig. 10

In the embodiment shown in Fig. 7, the locking device which prevents operation of each flying weight 10 due to the centrifugal force before the coupling has reached a predetermined speed of rotation comprises a circular groove 37 cut in the push-rods 13 operatively engaged by the finger 12 of the flying weight, which groove 37 cooperates with a locking ball 38 engaged by a spring 39 radially arranged in a recess of the body of the cup-shaped disc 8.

There will be seen that, by this arrangement, the flying weights 10 are positively maintained in their inoperative position as long as the pressure due to the centrifugal force of the weight 10 and exerted by the finger 12 on the push-rod 13 is not great enough to drive the ball 38 out from the groove 37 of said push-rod.

It will be observed that said locking device 37, 38, 39 has no influence on the return of the different elements in their inoperative position upon stopping of the mechanism, said return to the inoperative position being ensured by the restoring spring 19 hereinbefore described.

Referring now to Fig. 8, the device differs from the embodiment shown in Fig. 3 by the following features:

(a) The armature 7' is fixedly secured to the fly-wheel 1 of the engine and the electromagnet 2' (with its winding 3') is fixedly secured to the cup 8' of the mechanical centrifugal clutch, current being led to said winding 3' through the cable 4' connected to the slip-ring 5' which cooperates with the brush 6', the return circuit being constituted by the metallic mass;

(b) The brush is supported by the housing of the coupling; this avoids any modification of the engine, either to secure the slip-ring and its insulation on the fly-wheel, or to mount the brush on the housing of the motor.

Wear of the brush is reduced by the fact that the diameter of the slip-ring 5' may be reduced, and that said slip-ring does not rotate as long as no current passes through the winding 3';

(c) The armature 20 is substituted by the electromagnet 2' which forms either an electromagnet for the armature 7' (rigid with the fly-wheel 1 of the engine) or an armature for the part 20' of the electromagnet 22';

(d) The disk 21' (the shape of which differs from that of the disk 21 of Figs. 1 and 3) has fixedly secured thereto by means of screws 46 a ring member 47 which forms an axial abutment (by means of a circumferential projection d' thereof) for the disc 17' which is angularly connected with said ring member 47 by splines 48.

Figure 9:
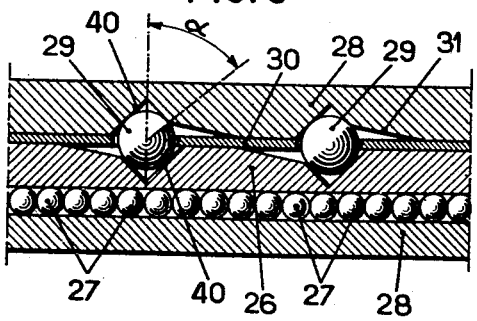
Fig. 9 shows diagrammatically a locking device of the mechanical part of the coupling of Fig. 8.

The device which ensures locking of the flying weights comprises, in the embodiment of Fig. 8 a recess 40 (Fig. 9) in the deepest part of each cam depression 31.

The balls 29 are maintained in said recesses 40 by springs 19'. Said springs are calibrated to permit rolling of the balls 29 of the angle a and entering the cam surfaces 31 only when the mechanism rotates at a predetermined speed.

By this arrangement it is possible, as in the preceding example, to operate the electromagnetic clutch without operating the mechanical centrifugal clutch as long as the device rotates at a lower speed than a predetermined speed.

The disc 24 is returned to its locking position relatively to the disc 14' by means of a plurality of springs 41 each of which is secured, on the one hand, to a pin 42 rigidly connected with the disc 24, and on the other hand, to a pin 43 rigidly connected with the disc 14'. In order to prevent a deflection of the springs 41 under the action of the centrifugal force, there is provided an outside series of peripherally arranged brackets 45 fixedly secured to the disc 24 and forming abutments.

The pressure on the clutch linings may be allowed to vary slightly, thus permitting adjustment of the clearance existing between the discs 14' and 17' on the one hand, and the clutch linings 15' on the other hand. Said clearance is defined by the shoulder d' which forms an abutment.

In the preceding embodiments the amount of displacement of the flying weights of the centrifugal clutch was constant; in the present embodiment said weights engage also an abutment at a in the case of Fig. 7, and at b in the case of Fig. 8, therefore the amount of movement of the disc 14' will be constant. When the linings 16' of the disc 15' are worn, the disc 17' is moved axially by the expansion of the springs 18' a sufficient amount to operate the driven shaft 36. On the contrary, when the linings 16' of the disc 15' are new, and therefore thicker, the springs 18' are more compressed than normal, and the pressure on the sides of the linings 16' is merely somewhat greater than the normal pressure while the movement of disk 17 is less.

In order to more clearly disclose the particular operation of the clutch device shown in Fig. 8, said figure represents also an operating scheme, the device being supposed to be mounted on a machine or on a motor car comprising one or a plurality of speeds, and it is understood that what is disclosed with reference to one speed is also valuable for any other speed.

The brush 6' which leads the current to the electromagnet 2' and the winding 22 of the stationary electromagnet 22' of the brake are connected through wires t and f respectively with the terminals of the commutating switch A which is constituted in this instance by the speed change lever the idling point of which is indicated by 0. The device is operated as follows:

The engine being started and throttled down, the lever A is turned from the position 0 to the position 0', and speed-changing takes place during said rotation. When said lever is at 0', a circuit is completed which sends current from the battery B through the wire f in the brake magnet 22'. Thus any undesirable action of remanent magnetism which is possible in the electromagnet 2' is prevented, and the centrifugal clutch is held motionless. The lever A is then turned from the position 0' to the position 0", thus causing the current to pass through the wire t in the electromagnet 2'.

It will be observed that it is necessary to return to the idling point to let in any speed, and therefore the risk of accidental engagement of the clutch, due to remanent magnetism of the electromagnet 3', is avoided by the fact that the brake magnet 22' is last energized when lever A is returned to the idling point.

From the foregoing description it will be evident to those skilled in the art that many changes and variations in the structure hereinbefore described by way of example may be made without departing from the principles of the invention, the scope of which is to be understood as embracing all forms of apparatus coming within the purview of the appended claims when they are construed as broadly as is consistent with the state of the prior art.

We claim:

1. In a power transmitting mechanism, the combination of a driving member, an electromagnetic clutch including a pair of traction elements, a centrifugal clutch, and a driven member, arranged in series in the order named, and a rotary member supporting one of said electromagnetic clutch elements, said centrifugal clutch including a friction disk secured to said driven shaft and a pair of cooperating disks secured to said rotary member on opposite sides of said first disk, said electro-magnetic and centrifugal clutches adapted to successively and jointly transmit the entire torsional stress from the driving to the driven member.

2. A power transmitting mechanism for disconnectably coupling a driving shaft to a driven shaft comprising, in combination: an electromagnetic clutch device including a primary member fixedly secured to said driving shaft, a cup-shaped secondary member and electromagnetic means for operatively connecting said primary member with said secondary member; and a centrifugal clutch device rigid with said secondary member of said electromagnetic clutch device, a disc member fixedly secured to said driven shaft, and means including a plurality of centrifugal weights pivotally mounted on said cup-shaped secondary member for connecting the latter with said disc member.

3. A power transmitting mechanism as claimed in claim 2 and comprising abutment means integral with said cup-shaped member and adapted to be engaged by said centrifugal weights.

4. A power transmitting mechanism, as claimed in claim 2 wherein said last-named means further includes a plurality of circumferentially arranged and axially extending push-rods slidably mounted in said cup-shaped member, a plurality of projections integral with and inwardly extending from said centrifugal weights, each of said projections being adapted to operatively engage one of said push-rods, and a rotative member having said push rods fixedly secured therein and being adapted to frictionally engage said disc member.

5. A power transmitting mechanism as claimed in claim 2 wherein said last-named means further includes a first ring member axially located relatively to said cup-shaped member and operatively connected with said centrifugal weights, a second ring member axially slidable and registering with said first ring member, the proximate faces of at least one of said ring members having tapered recesses therein, a plurality of balls arranged in said recesses for separating said ring members, and a rotative member fixedly secured upon said second ring member, said latter member being adapted to frictionally engage said disc member for operative connection thereof with said cup-shaped member.

6. A power transmitting mechanism as claimed in claim 2 and comprising a housing for said mechanism, an electromagnetic brake device including an electromagnet rigid with the housing, and an armature rigid with said cup-shaped member.

7. A power transmitting mechanism as claimed in claim 2 and comprising centrifugally actuated pawl means for operatively connecting said driving shaft with said driven shaft, said pawl means being alternately operable with said centrifugal weights.

8. A power transmitting mechanism as claimed in claim 2 and comprising free wheel means alternately operable with said centrifugal weights operatively connecting said driving shaft with said driven shaft.

9. A power transmitting mechanism according to claim 2 in combination with means for locking said device in inoperative position as long as the angular speed is lower than a predetermined speed.

10. A power transmitting mechanism for disconnectably coupling a driving shaft to a driven shaft comprising in combination: an electromagnetic clutch device including a primary member fixedly secured to said driving shaft, a secondary member and electromagnetic means for operatively connecting said primary member with said secondary member; a plurality of circumferentially arranged and axially extending push-rods carried by said secondary member, a secondary disc member fixedly secured to said driven shaft, a plurality of centrifugal weights pivotally mounted on said secondary member and having inwardly extending therefrom integral projections adapted to operatively engage said push-rods, a rotative member axially movable by said push-rods, said rotative member being adapted to frictionally engage said disc member in response to the movement of said weights, and means operable at one range of speeds for locking said weights against operation, the latter means being responsive to a second speed range to release said weights.

11. A power transmitting mechanism for disconnectably coupling a driving shaft to a driven shaft comprising, in combination: an electromagnetic clutch device including a primary member fixedly secured to said driving shaft, a secondary member and electromagnetic means for operatively connecting said primary member with said secondary member; a disc member fixedly secured to said driven shaft, a plurality of centrifugal weights pivotally mounted on said secondary member, a first ring member axially located relatively to said secondary member and operatively connected with said centrifugal weights, a second ring member axially slidable and registering with said first ring member, said ring members having a plurality of registering and oppositely disposed cam recesses therein, a plurality of balls arranged in said recesses, a rotative member fixedly secured upon said second ring member and being adapted to frictionally engage said disc member for operative connection thereof with said cup-shaped member, and a device operable at one range of speeds to lock said centrifugal weights, and responsive to a second range of speeds to release the weights for operation.

12. A power transmitting mechanism as claimed in claim 10, wherein said last means comprises, for each of said centrifugal weights, a ball engaging a circular groove in said push-rod and a spring engaging said ball, said spring being radially arranged in a recess of said cup-shaped member.

13. A power transmitting mechanism as claimed in claim 11, wherein each of said cam recesses comprises in the deepest portion thereof a depressed bore adapted to receive therein said ball.

14. In a mechanism for transmitting power from a rotary driving member to a rotary driven member, the combination of an electromagnetic clutch having a first traction element secured to said driving member, a centrifugal clutch having a second traction element secured to said driven member, and a third traction element engageable with the latter, a carrier member, said first and second traction elements having fourth and fifth traction elements respectively cooperating therewith, and means carried by said carrier member for exerting substantially equal and opposite axial thrusts by said third and fifth traction elements on said second traction element when said centrifugal clutch is connected.

MICHEL GRAVINA.
MARCEL HAWADIER.

REFERENCES CITED

The following references are of record in the file of this patent:

UNITED STATES PATENTS

| Number | Name | Date |
|---|---|---|
| 732,943 | Jenatzy, Fils | July 7, 1903 |
| 1,446,806 | Mathis | Feb. 27, 1923 |
| 1,870,647 | Rawson | Aug. 9, 1932 |
| 1,933,208 | Cotal | Oct. 31, 1933 |
| 1,941,588 | Vail | Jan. 2, 1934 |
| 2,071,428 | Prince | Feb. 23, 1937 |
| 2,077,487 | Lyman | Apr. 20, 1937 |
| 2,120,734 | Cotal | June 14, 1938 |
| 2,145,381 | Wemp | Jan. 31, 1939 |
| 2,163,991 | Tower | June 27, 1939 |
| 2,180,612 | Schlenker | Nov. 21, 1939 |

FOREIGN PATENTS

| Number | Country | Date |
|---|---|---|
| 48,566 | France | Apr. 5, 1938 |